July 13, 1965  T. P. M. ROUSE, JR  3,193,919
METHOD OF FABRICATING PRESSURE VESSELS
Original Filed May 26, 1961  3 Sheets-Sheet 1

INVENTOR.
T. P. M. ROUSE, JR.

BY W. O. Duesenberry
O. H. Hodges
ATTORNEYS.

INVENTOR.
T. P. M. ROUSE, JR.

BY

ATTORNEYS.

July 13, 1965  T. P. M. ROUSE, JR  3,193,919
METHOD OF FABRICATING PRESSURE VESSELS
Original Filed May 26, 1961  3 Sheets-Sheet 3

INVENTOR.
T. P. M. ROUSE, JR.

BY

ATTORNEYS

United States Patent Office 3,193,919
Patented July 13, 1965

3,193,919
METHOD OF FABRICATING PRESSURE VESSELS
Thomas P. M. Rouse, Jr., 17 Glenview Drive,
Bristol, R.I.
Original application May 26, 1961, Ser. No. 113,591, now
Patent No. 3,167,204, dated Jan. 26, 1965. Divided
and this application Oct. 2, 1962, Ser. No. 227,960
4 Claims. (Cl. 29—477)
(Granted under Title 35, U.S. Code (1952), sec. 266)

This application is a division of application Serial No. 113,591, filed May 26, 1961, now Patent No. 3,167,204 for Pressure Vessels.

The invention described herein may be manufactured and used by or for the Government of the United States of America for governmental purposes without the payment of any royalties thereon or therefor.

This invention relates to new methods for the construction of pressure vessels or the like. More specifically, it relates to such new methods for application in torpedoes and submarine hulls.

Most external pressure hulls are constructed from an outer shell of metal reinforced by strengthening ribs which are usually of rectangular cross-section. Other methods of making pressure hulls employ cast metal or plastic cylinders with or without internal strengthening ribs, and metal cylinders with externally attached strengthening ribs. Maximum vessel performance and volumetric efficiency are not possible with any of these constructions. Weight, size and volumetric efficiency have a considerable effect upon vessel performance. Cost of fabrication and ease of maintenance are usually high when high volumetric efficiency and performance are required. Volumetric efficiency as used here refers to the ratio of the total unrestricted internal volume to the total volume displaced by the exterior dimensions of the structure.

It is therefore an object of this invention to increase the performance of underwater vehicles and external pressure vessels by providing new methods for the construction thereof which enable substantial savings in weight.

Another object of this invention is to provide such new methods for increasing the volumetric efficiency of underwater vehicles and external pressure vessels.

Still another object of this invention is to provide a method for fabricating underwater vehicles and pressure vessels of the aforementioned type at lessened cost and in which the vessels require less maintenance.

Other objects and many of the attendant advantages of this invention will be readily appreciated as the same becomes better understood by reference to the following detailed description when considered in connection with the accompanying drawings in which like reference numerals designate like parts throughout the several figures thereof and wherein.

Figure 1:
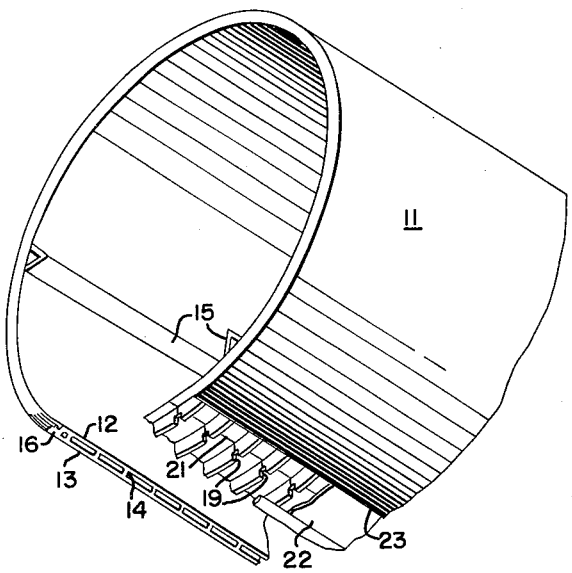
FIG. 1 is a perspective view, partly in section, and partly broken away, of one of the embodiments of the present invention.

Referring now to the drawings and more particularly to FIG. 1, there is shown a cylindrical section 11 having an inner wall 12 and an outer wall 13 with stiffening ribs 14 between the two walls, formed integral therewith, and in a plane perpendicular to the axis of section 11.

Brackets 15 are attached to inner wall 12 and are parallel substantially to the axis of the cylinder. Joint ring 16 is positioned at the near end of the cylindrical section as viewed in the figure and is integral therewith. Notches 19 are formed in ribs 14 and are in alignment. Mating ends of inner shell 12 and ribs 14 are jointed together at seam 21 by a weld, and section 22 occupies a cut-out part of the outer wall 13 and is joined thereto at seams 23 by welds.

Figure 2:
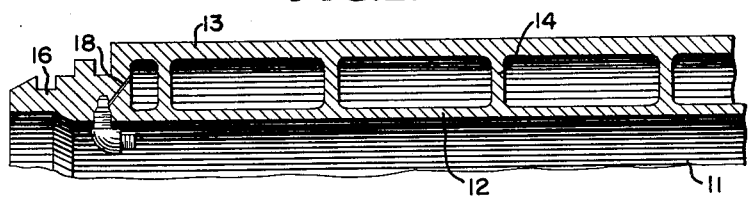
FIG. 2 is a fragmentary sectional view, greatly enlarged, of the embodiment of FIG. 1.

There is shown in FIG. 2 the section 11 with inner wall 12, outer wall 13 and ribs 14 between the two walls and integral therewith. Joint ring 16 is formed integrally with the inner and outer walls and is adapted to be used in conjunction with another joint structure attached to another section for the purpose of joining the two sections. Ribs 14 cause annular chambers to be formed between walls 12 and 13. One end of fitting 17 is attached to joint ring 16 and the other end of fitting 17 is adapted to be coupled to a fluid delivery valve. A passageway 18 communicates between fitting 17 and an annular chamber formed between joint ring 16 and the nearest rib 14.

Figure 3:
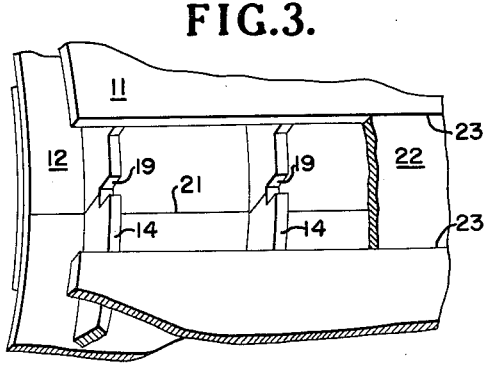
FIG. 3 is an enlarged perspective view, partly broken away, of that portion of the embodiment of FIG. 1 where a seam occurs.

There is shown in FIG. 3 the joining details of section 11. The meeting ends of the inner wall 12 are jointed together by a weld at seam 21, the weld also joining ribs 14 together at the ends where they meet. A portion of outer wall 13 is removed along with such parts of ribs 14 as is necessary to expose inner pall 12 and ribs 14 for the purpose of completing the seam. Section 22 occupies the cut-out area in outer wall 13 and is joined to outer wall 13 at seams 23 by welds.

Figure 4:
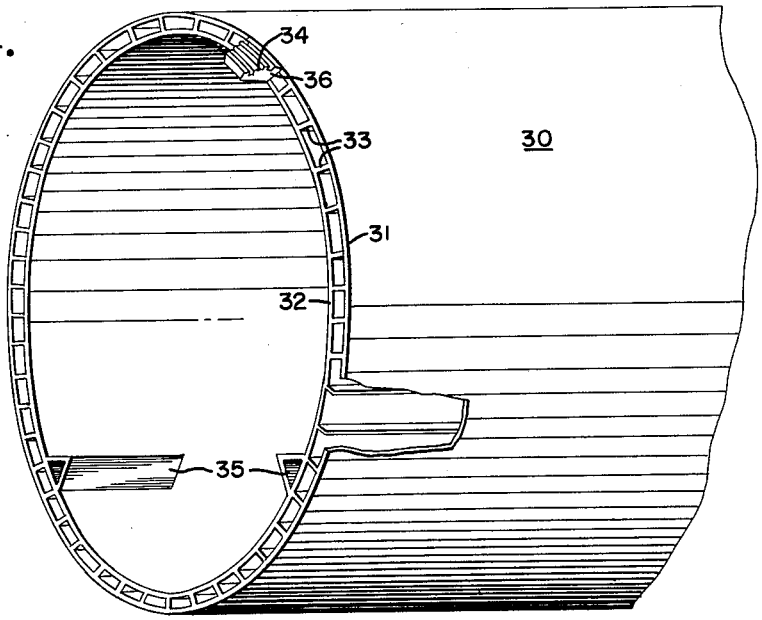
FIG. 4 is a perspective view, partly broken away, of another embodiment of the instant invention.

FIG. 4 illustrates a cylindrical section 30 having an outer wall 31 and an inner wall 32 with ribs 33 therebetween, formed integral therewith and substantially parallel to the axis of section 30. Joint ring 34 is attached to cylindrical section 30 by a weld at the end adjacent thereto and is provided with annular groove 36 in the surface which abuts section 30. Brackets 35 are formed integral with the inner wall 32 of section 30 and are substantially parallel to the axis of the section.

Figure 5:
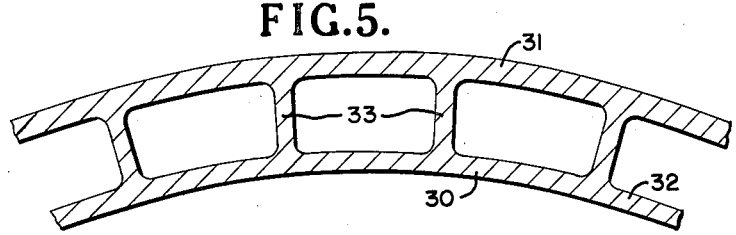
FIG. 5 is an enlarged partial edge view of the embodiment of FIG. 4.

There is shown in FIG. 5 a sectional view of a portion of cylindrical section 30 which illustrates in greater detail the outer wall 31 and the inner wall 32 with stiffening ribs 33 therebetween and integral therewith, the ribs being substantially parallel to the axis of section 30.

Figure 6:
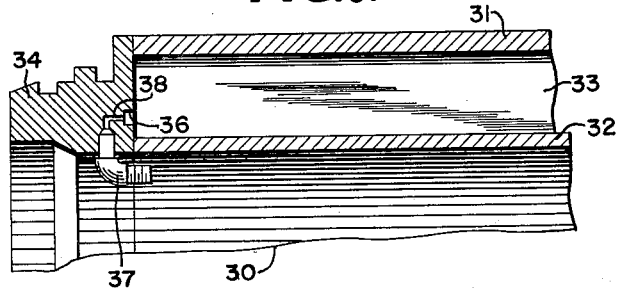
FIG. 6 is a fragmentary sectional view of the embodiment of FIG. 4.

On FIG. 6 there is shown section 30 with inner wall 32 and outer wall 31. A joint ring 34 is attached to an end of section 30 by a weld and is provided with an annular groove 36 in the face thereof abutting the section. Passageway 38 communicates with the groove 36 and therefore with the chambers formed between each pair of adjacent ribs 33. Fitting 37 is attached to joint ring 34 and communicates with passageway 38, and is adapted to be coupled to a fluid delivery valve.

Figure 7A:
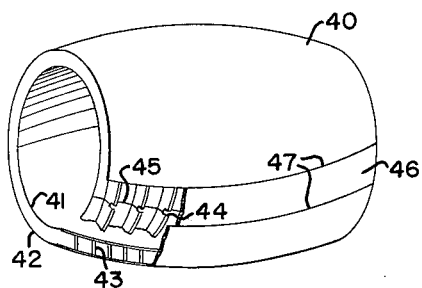
FIG. 7a is a perspective view of another embodiment of the invention, partly in section and partly broken away.

In FIG. 7a there is shown a barrel-shaped section 40 having an inner wall 41 and an outer wall 42 with ribs 43 therebetween, formed integral therewith, and in a plane substantially perpendicular to the axis of the section 40. Ribs 43 are provided with notches 44 which are in alignment. Meeting ends of inner wall 41 and ribs 43 are joined at seam 45 by a weld. A portion of outer wall 42 is cut-out and removed in order to complete seam 45, and section 46 is positioned in the cut-out portion, the section 46 being joined to outer wall 42 at seams 47 by welds.

Figure 7B:
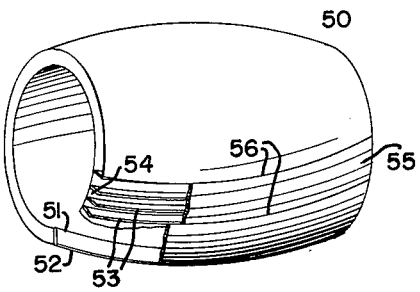
FIG. 7b is a view similar to FIG. 7a of an alternative form of the device.

In FIG. 7b, a barrel-shaped section 50 is shown having an inner wall 51 and an outer wall 52 with ribs 53 therebetween, formed integral therewith, and running longitudinally of the length of the section 50. The meeting faces of the inner wall 51 are joined at a seam 54 by a weld. A portion of the outer wall 52 is cut-out and removed in order to complete the seam 54, and section 55 is inserted in cut-out portion, the section 55 being joined to the outer wall 52 at seams 56 by welds.

Figure 8A:
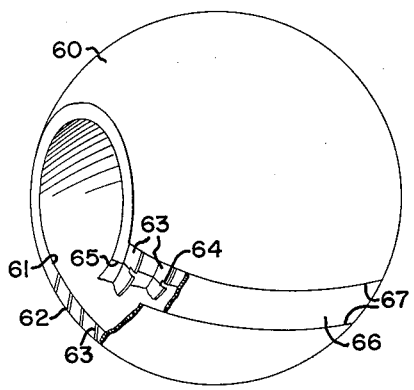
FIG. 8a illustrates still another embodiment of the invention, partly in section and partly broken away.

In FIG. 8a there is illustrated a section 60 of a hollow sphere having an inner wall 61 and an outer wall 62 with ribs 63 therebetween, integral therewith, and substantially perpendicular to the axis of the sphere which is perpendicular to the plane of the flat end portion. The meeting ends of walls 61 and ribs 63 are joined at seams 65 by a weld. Ribs 63 are provided with notches 64 which are in alignment. A strip of outer wall 62 is cut-out and removed in order to complete seam 65, and strip 66 is positioned in the cut-out section, the strip 66 being joined to the outer wall 62 at seam 67 by a weld.

Figure 8B:
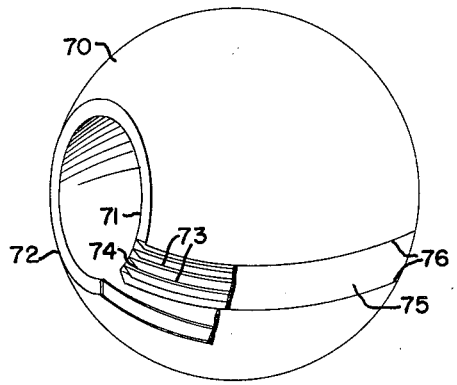
FIG. 8b is a view similar to FIG. 8a of an alternate form of the device.

There is shown in FIG. 8b a hollow section of a sphere 70, having an inner wall 71 and an outer wall 72 with ribs 73 positioned therebetween, integral therewith, and running substantially perpendicular to the direction in which the ribs run in FIG. 8a. The meeting ends of inner walls 71 are joined at seams 74 by a weld, and a strip of outer wall 72 is cut-out and removed to complete the seam 74. A strip 75 is inserted in the cut-out strip and is joined to the outer walls 72 at seams 76 by welds.

Figure 9A:
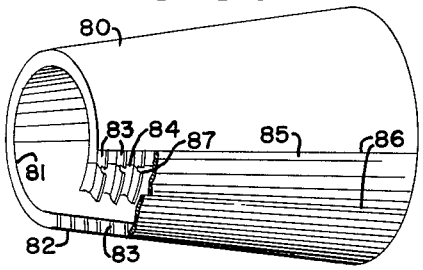
FIG. 9a illustrates still another embodiment of the invention, partly in section and party broken away.

In FIG. 9a there is shown a frusto-conical section 80 having an inner wall 81 and an outer wall 82 with ribs 83 positioned therebetween, integral therewith, and being essentially perpendicular to the axis of the cone. The meeting ends of the inner wall 81 are joined at seam 84 by a weld, and the ribs 83 are provided with notches 87 that are in alignment. A strip of outer wall 82 is cut out and removed in order to complete seam 84, and the strip 85 is inserted in the cut out strip, the strip 85 being joined to the outer wall 82 at seams 86 by welds.

Figure 9B:
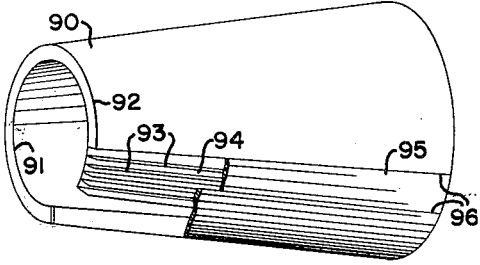
FIG. 9b is a view similar to FIG. 9a of an alternative form of the device.

In FIG. 9b, a frusto-conical section 90 is shown having an inner wall 91 and an outer wall 92 with ribs 93 positioned therebetween, integral therewith, and running the length of the section. The meeting ends of inner wall 91 are joined at seam 94 by a weld, and a portion of the outer wall 92 is cut out and removed to allow completion of the seam 94. The strip 95 is inserted in the cut out portion and is joined to the outer wall 92 at seams 96 by welds.

The embodiments in the figures are familiar geometrical shapes and are made by first extruding a sheet of material consisting of an inner wall and an outer wall with strengthening ribs therebetween. Once this sheet of material has been extruded, it is then rolled into the shape of a cylinder and the meetings ends of the inner wall are welded together. In order to weld the inner wall it is necessary to cut out a portion of the outer wall to expose the meeting ends of the inner wall. Next, in order to restore the continuity of the outer wall a section of a piece of material is cut and placed in the cut-out portion of the outer wall and welded in position.

Alternatively, a cylindrical shape may be extruded in one piece with no seams whatsoever when the strengthening ribs are parallel to the longitudinal axis thereof. This embodiment of the invention is shown in FIGS. 4, 5 and 6, and is preferable to a shape having seams.

Having obtained a cylinder as aforementioned with or without seams, as the case may be, the cylinder may then be stretch-formed by means of a mandrel to form the barrel shape shown in FIGS. 7a and 7b.

It will be noted that in the cylinder of FIGS. 1, 2 and 3, the strengthening ribs are substantially perpendicular to the longitudinal axis of the cylinder, while in the cylinder of FIGS. 4, 5 and 6 the ribs are substantially parallel to the longitudinal axis of the cylinder. These two cylindrical sections can be made by rolling the sheet in the manner desired to orient the ribs properly.

The sections of FIGS. 8a and 8b may be made by taking the extruded sheet material and forming it over a form to produce the desired shape. The meeting ends of the inner wall are then welded and a section of the outer wall is removed to allow this welding to take place. Then a separate strip of material is reinserted in the cut out portion and welded down to restore the continuity of the outer wall. It will be noted that the direction of the ribs in FIGS. 8a and 8b are substantially at 90° to each other. The orientation of the ribs depends on the way in which the sheet-extruded material is rolled.

In the embodiment shown in FIGS. 9a and 9b, a sheet of extruded material is first cut to the desired shape so that, upon rolling, a cone or frusto-cone will result. The meeting ends of the inner wall are then welded together, it being necessary to remove a strip of the outer wall in order to complete this operation. Next, in order to restore the continuity of the outer wall, a strip of material is inserted in the cut out portion thereof and welded down. It will be noted that the direction of the ribs in FIGS. 9a and 9b are substantially at 90° to each other. This again depends upon the way in which the sheet-extruded material is rolled.

In all cases where the strengthening ribs are substantially perpendicular to the axis of the particular section, it is necessary for each rib to have a notch in order that there be communication between the compartments formed between the ribs and the inner and outer walls. Such notches are cut into the ribs after a portion of the outer wall is removed and before the welding of the meeting faces of the inner wall takes place. While applicant's disclosed embodiments are familiar geometrical shapes, the invention is by no means limited to such shapes, for one may take the extruded sheet material and form it over any shaped die, as desired. It is not necessary that the direction of the strengthening ribs be as applicant has disclosed them in the disclosed embodiments as they may be oriented in any direction.

The preferred material for use in making these extrusions is aluminum, but many other materials having similar properties are available as a matter of choice.

Mounting brackets, pads, rails, or the like of uniform axial configuration can be extruded integrally and the undesired portions machined away. Alternatively, they may be welded to the inner wall of the section for rigid attachment. Joint rings or other attaching devices may be extruded integrally in the case of the embodiment in which they run parallel to the strengthening ribs or may be welded to the section in other cases. In the case of the welded joint ring or other attaching device, an annular groove is provided in the face thereof which abuts the section to which it is welded in order for there to be communication between the cells formed between the inner and outer walls and adjoining ribs, as such cells are used for fluid storage. The fluid may be a liquid or a gas or a combination of the two. Alternatively, the cells may be filled with sound absorbing material or ballast. Also, foaming of attenuating material in the cells may be accomplished if desired.

Applicant's new method makes possible previously impossible weight savings and volumetric efficiency. The method results in a lighter structure than was previously possible to withstand the same pressure, and also results in far greater volumetric efficiencies than with previous configurations and methods. When the volume of the cells is considered, the volumetric efficiency of applicant's cellular structure is in the neighborhood of 90%.

What is claimed is:

1. The method of fabricating a metal section for constructing pressure vessels and the like which comprises:
   (a) extruding a flat metallic sheet having two parallel wall surfaces and a plurality of longitudinal stiffening ribs between said surfaces and integral therewith along the entire length of said surfaces, said ribs being substantially perpendicular to the wall surfaces and parallel to the direction of the extrusion;
   (b) rolling the sheet so that opposite edges of said wall surfaces meet substantially forming a tubular section; and
   (c) joining the edges thus meeting by cutting out a portion of the outer wall surface of said tubular section along the axial length thereof, welding the meeting edges of the inner wall surface in the region exposed by the removal of said cut-out portion, replacing said cut-out portion with a strip of the same dimensions and welding said strip to the outer wall surface from which said cut-out portion was removed along the lines of cutting therefrom.

2. The method of claim 1 which includes the additional step of subsequently stretch-forming the section.

3. The method of claim 1 which includes the additional step of attaching a lip to the end of the section, said lip being adapted to be used in conjunction with another lip on another section for the purpose of joining the two sections.

4. The method of fabricating a metal section for constructing pressure vessels and the like which comprises:
   (a) extruding a flat metallic sheet having two parallel wall surfaces and a plurality of longitudinal stiffening ribs between said surfaces and integral therewith along the entire length of said surfaces, said ribs being substantially perpendicular to the wall surfaces and parallel to the direction of the extrusion;
   (b) rolling the sheet so that opposite edges of said wall surfaces meet and that one end of each of said ribs meets with the other end thereof, substantially forming a tubular section in which each of said ribs is substantially circular in form and lies wholly within a given plane, each plane being parallel to each other plane and perpendicular to the longitudinal axis of said section; and
   (c) joining the edges of said wall surfaces and said rib-ends thus meeting to form the section.

References Cited by the Examiner

UNITED STATES PATENTS

| | | | |
|---|---|---|---|
| 724,210 | 3/03 | Scherer | 138—148 X |
| 1,441,304 | 1/23 | Slocomb | 29—477 |
| 1,712,803 | 5/29 | Wood | 138—148 X |
| 2,212,912 | 8/40 | Booth. | |
| 2,274,519 | 2/42 | Barrett | 29—455 X |
| 2,699,959 | 1/55 | Zallea. | |
| 2,770,874 | 11/56 | Lindow | 29—421 |
| 3,004,330 | 10/61 | Wilkins | 138—115 X |
| 3,110,754 | 11/63 | Witort et al. | 138—148 X |

WHITMORE A. WILTZ, *Primary Examiner.*